US 6,652,826 B1

(12) United States Patent
Chowdhury et al.

(10) Patent No.: US 6,652,826 B1
(45) Date of Patent: Nov. 25, 2003

(54) PROCESS FOR ELIMINATION OF LOW CONCENTRATIONS OF HYDROGEN SULFIDE IN GAS MIXTURES BY CATALYTIC OXIDATION

(75) Inventors: Aminul Islam Chowdhury, Calgary (CA); Eric Lars Tollefson, Calgary (CA); Tushar Kanti Ghosh, Stilwater, OK (US)

(73) Assignee: Xergy Processing Inc., Calgary (CA)

(*) Notice: Subject to any disclaimer, the term of this patent is extended or adjusted under 35 U.S.C. 154(b) by 0 days.

(21) Appl. No.: 08/487,629

(22) Filed: Jun. 7, 1995

Related U.S. Application Data

(63) Continuation of application No. 08/079,831, filed on Jun. 22, 1993, now abandoned, which is a continuation of application No. 07/655,281, filed on Feb. 14, 1991, now abandoned, which is a continuation of application No. 07/370,824, filed on Jun. 23, 1989, now abandoned.

(51) Int. Cl.$^7$ ............................................. C01B 17/04
(52) U.S. Cl. ............................. 423/573.1; 423/576.2; 423/576.8; 423/245.1; 95/143
(58) Field of Search ................. 423/224, 230, 423/244.01, 244.03, 245.1, 573.1, 576.2, 576.8, 220; 95/90, 135, 136, 143

(56) References Cited

U.S. PATENT DOCUMENTS

| | | | | |
|---|---|---|---|---|
| 2,899,474 A | * | 8/1959 | Ricards | 260/676 |
| 3,391,988 A | * | 7/1968 | Friess | 23/2 |
| 4,196,183 A | * | 4/1980 | Li | 423/573 G |
| 5,256,384 A | * | 10/1993 | Rolke et al. | 423/220 |
| 5,916,438 A | * | 6/1999 | Trocciola et al. | 210/188 |

FOREIGN PATENT DOCUMENTS

| | | | |
|---|---|---|---|
| CA | 766568 | * | 9/1967 |
| CA | 1117276 | * | 2/1982 |

OTHER PUBLICATIONS

Kohl et al. "Gas Purification" 4th Ed. Gulf Publishing Co. Houston TX USA, pp. 442–449, ISBN No. 0–87201–314–6. 1985.*

"Gas Purification", 4th ed. by Kohl et al. Gulf Publishing (1985) U.S.A., pp. 442–446.*

* cited by examiner

Primary Examiner—Wayne A. Langel
Assistant Examiner—Timothy C. Vanoy
(74) Attorney, Agent, or Firm—William H. Holt

(57) ABSTRACT

A process is described for the elimination of hydrogen sulfide from gas mixtures by catalytic oxidation over activated carbon catalyst which converts the hydrogen sulfide to elemental sulfur and water, the former being sorbed by the activated carbon while the latter is transported with the gas mixture and may be removed by known dehydration processes. The above oxidative process is conducted at elevated temperatures and pressures and with sufficient residence time to assure virtually complete conversion of the hydrogen sulfide with minimal production of by-product sulfur dioxide. Traces of heavy hydrocarbons in the feed gas mixture which may reduce the life of the catalyst and the quality of the sulfur product may be removed by cryogenic means or by sorption on an activated carbon guard bed. Both the activated carbon catalyst used to oxidize the hydrogen sulfide and the activated carbon used to remove heavy hydrocarbons from the feed gas may be regenerated by passing inert gas or product gas through the beds of these materials at elevated temperatures for sufficient time to remove the sorbed sulfur or the heavy hydrocarbons, respectively for use as by-products of the process.

15 Claims, 7 Drawing Sheets

PROCESS FOR ELIMINATION OF LOW CONCENTRATIONS OF HYDROGEN SULFIDE IN GAS MIXTURES BY CATALYTIC OXIDATION

This is a continuation of application Ser. No. 08/079,831 filed Jun. 22, 1993 now abandoned, which is a continuation of application Ser. No. 07/655,281 filed Feb. 14, 1991, abandoned, which is a continuation of Ser. No. 07/370,824 filed Jun. 23, 1989, abandoned.

BACKGROUND OF THE INVENTION

1. Field of the Invention

This invention relates to a cyclic process for direct conversion of low concentrations of hydrogen sulfide ($H_2S$) in gas mixtures to elemental sulfur by catalytic oxidation over an activated carbon catalyst, sorption of the sulfur product by the said carbon and subsequent desorption and recovery of the sulfur during regeneration of the catalyst.

2. Prior Art

Current practice in the sour natural gas processing industry is to remove the acid components ($H_2S$ and $CO_2$) from the natural gas by a sweetening process. The removed hydrogen sulfide, if present in small quantities, is incinerated to sulfur dioxide ($SO_2$) and vented to the atmosphere provided that the amount of released $SO_2$ is acceptable according to regulations with respect to the environment. If the quantity of $H_2S$ removed by a sweetening process is sufficiently large, it is generally fed to a Claus plant and recovered as elemental sulfur.

Recent more stringent regulations in certain jurisdictions concerning the release of sulfur as $SO_2$ to the atmosphere have made the sour gas processing industries aware that they will be required to reduce sulfur-containing emissions to the environment substantially. With the increasing demand for elemental sulfur and the need to meet the existing environmental regulations, considerable attention has been given to the development of inexpensive and effective methods for the recovery of elemental sulfur from natural gases containing $H_2S$.

It has been known for some time that hydrogen sulfide in natural gas or other gases can be oxidized in the presence of various catalysts to sulfur dioxide or sulfur. Examples of some of these processes may be found in the patent literature.

In Canadian Patent 1,172,428 by R. F. Jagodzinski and R. K. Kerr issued on Aug. 14, 1984, a process is disclosed whereby hydrogen sulfide in sour gas is reacted with oxygen at pressures greater than 5 atmospheres over an activated alumina or a vanadium pentoxide catalyst. The catalyst is continuously soaked and submerged in liquid sulfur in a reactor at temperatures between 250 and 550° C. Elemental sulfur is produced along with a substantial fraction of $SO_2$. The unreacted $H_2S$ from this first reactor is then reacted with the produced $SO_2$ to produce elemental sulfur and water in a second reactor.

In Canadian Patent 1,063,321 by W. H. Powlesland and J. W. Smith issued on Oct. 2, 1979, a process is disclosed whereby $H_2S$ from a "fouled gas" is removed by passing the gas through hydrated hematite ($Fe_2O_3$) pellets in a chamber, thereby producing water and forming elemental sulfur which coats the pellets. Pellets are continuously withdrawn from the bottom of the chamber to a tumbler where continuous tumbling of the pellets abrades the elemental sulfur from their surface. The sulfur is recovered and the abraded pellets are then continuously returned to the top of the chamber. The process is complex and the composition of the product stream is not given. It is stated that during low temperature regeneration of the product $Fe_2S_3$ by oxidation, the possibility of $SO_2$ production is high because of the high temperature rise in the following reaction (1) which in turn can initiate reaction (2)

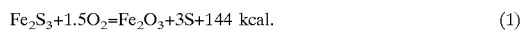

$$Fe_2S_3 + 1.5O_2 = Fe_2O_3 + 3S + 144 \text{ kcal.} \quad (1)$$

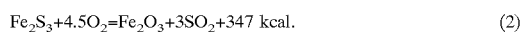

$$Fe_2S_3 + 4.5O_2 = Fe_2O_3 + 3SO_2 + 347 \text{ kcal.} \quad (2)$$

It is advised in the patent that reaction (2) be avoided if possible because of $SO_2$ production.

In Canadian Patent 722,113 issued on Nov. 23, 1965, E. E. Baker and W. A. Duncan describe a process in which hydrogen sulfide in natural gas is oxidized in a bed of molecular sieve (crystalline zeolite) pellets having an apparent pore size of at least 4.6 Angstrom units (AU) at temperatures below 150° F. and at a "first higher pressures" (100–1000 psig) thereby adsorbing the hydrogen sulfide. A hydrogen sulfide-depleted natural gas stream is discharged from the first bed. The pressure in the first bed is then reduced to a "second lower pressure" (50 psig) at which hydrogen sulfide and other gases are desorbed. The released gases are then adsorbed in a second molecular sieve bed of crystalline zeolite again having an apparent pore size of at least 4.6 A.U. at temperatures in the range of 350°–750° F. The sorption is conducted in the presence of free oxygen so as to produce and recover elemental sulfur. This is a two-step process. There is no mention of $SO_2$ production.

In Canadian Patent 1,117,276 by K. D. Henning et al. issued on Feb. 2, 2002, a process is disclosed for elimination of sulfur compounds, in particular hydrogen sulfide, from gases containing the same, by reaction with oxygen and/or $SO_2$ in the presence of activated carbon at elevated temperatures to produce elemental sulfur. The process is performed at temperatures between 120 and 240° C. and at pressures ranging from 1 to 50 bars and with $O_2/H_2S$ molar ratios from 1.53 to 2.2 (i.e. 3.06 to 4.4 times the stoichiometric ratio). A two-step process is necessary if the $H_2S$ content in the feed gas exceeds 1318 ppm (i.e. 2 g $H_2S$ per $m^3$ of feed gas). The regeneration of the carbon in the first adsorber is less frequent than that in the second adsorber because of its autoregeneration. When regeneration is required, it is carried out with a hot inert gas. The preferred particle size of the activated carbon is 3 to 6 mm. In the first adsorber the activated carbon has a medium pore radius between 7–12 A.U. while in the second adsorber it is 5–8 A.U. There is no mention of the effect of pressure on $H_2S$ conversion and $SO_2$ production.

The disadvantages of the above-mentioned processes are that they are complicated and that some of them produce substantial amounts of $SO_2$. None, except the last one, uses activated carbon as a catalyst during the catalytic oxidation of $H_2S$. Although Patent 1,117,276 describes a process which is similar to the process being disclosed herein, it fails to recognize the positive effect of elevated pressure operation to achieve (a) high hydrogen sulfide conversions to elemental sulfur and (b) reduced $SO_2$ production. In addition, it has been found that by use of lower $O_2/H_2S$ ratios than the above patent describes, lower $SO_2$ production can be achieved at high $H_2S$ conversion levels.

The above mentioned patents fail to recognize the deleterious effects of having traces of heavy hydrocarbons in the feed gas. Unless these components are removed by means of cryogenic equipment or a guard bed, the overall life of the catalyst will be reduced, the time between regenerations of the catalyst will be shortened and the quality of the product sulfur will deteriorate.

Canadian Patent 1,117,276 fails to recognize the value of operation at pressures beyond the range specified (1 to 50 bars), in terms of being able to use lower $O_2/H_2S$ molar ratios which favor lower $SO_2$ production, in terms of more effective utilization of the activated carbon catalyst between regenerations and in terms of reduced energy requirements in processing the gas ready for delivery to a pipeline for sale at pressures of, for example, 65 to 70 bars. Furthermore, the use of higher $O_2/H_2S$ ratios than are required leaves more unconverted oxygen and the associated nitrogen in the gas causing dilution and a lower calorific value of the product.

SUMMARY OF THE INVENTION

The objectives of the present invention are to provide a simple and efficient process to oxidize $H_2S$ in gas mixtures catalytically in the presence of air and an activated carbon catalyst so as to produce substantially pure elemental sulfur and, simultaneously, to reduce the production of $SO_2$ to acceptable levels so that the product gas can be fed directly into pipelines ready for use by consumers in the case of natural gas or it can be burned, flared or otherwise vented to the atmosphere. According to this invention:

Sour natural gas or other gas mixtures containing low concentrations (preferably in the range from 4 ppm to 5 mol %) of $H_2S$ is mixed with air/oxygen at ($O_2/H_2S$ ratios of 1.0 to 3.0 but preferably 1.1 to 2.0 times the stoichiometric requirement) and passed through a reactor containing an activated carbon catalyst at temperatures between 130 and 220° C. but preferably between 150 and 200° C. with residence times from 1 to 90 seconds and at pressures ranging from 100 up to 7000 kPa. The particle size of the catalyst used was 2.38×0.841 mm. It had a mean pore radius of 2.9 nm and a total pore volume of 1.0 cm$^3$/g. Hydrogen sulfide in the gas mixture is oxidized to elemental sulfur and water with very small $SO_2$ production according to the following reactions

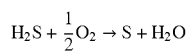
(3)

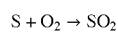
(4)

It has been discovered that the higher the operating pressure in the reactor, the lower is the $SO_2$ production. This is unexpected since Reaction 4 should be favored by higher pressure.

FIG. 1 shows the arrangement of the apparatus used to conduct the operations at pressures up to 640 kPa. Prior to entering the reactor, air and hydrogen sulfide are mixed so that the desired $O_2/H_2S$ ratio is achieved. Initially, most of the produced sulfur is deposited in the micropores of the activated carbon catalyst. Gradually the catalyst loses its activity due to increased sulfur loading of the micropores. FIG. 2 provides results of experiments conducted at various pressures up to 640 kPa. It shows that with increased operating pressures in the reactor, virtually complete conversion of the hydrogen sulfide can be maintained for a longer period than is possible at lower pressures and with a substantial reduction in the $SO_2$ production.

In view of the advantages observed from operation at higher pressures, further experiments were conducted at 5600 kPa using mass flowmeters to monitor the gas flows and a back pressure regulator to control the system pressures as can be seen in FIG. 3. The results of this experiment are given in FIG. 4. The results further confirm the advantages of elevated pressure operation in terms of high $H_2S$ conversion for longer periods accompanied by reduced $SO_2$ production.

FIG. 5 shows the reduction in the vapor pressure of deposited sulfur due to the capillarity effect in the micropores of the catalyst. We have discovered that when these pores are filled, the vapor pressure of sulfur increases so that there is a greater tendency for Reaction 4 to proceed producing $SO_2$. It is recognized that by increasing the reaction operating pressure the partial pressure of sulfur vapor in the reactor is reduced and that this decreases the rate of $SO_2$ production. The catalyst may be loaded with sulfur up to 80–150% of its mass before its activity decreases significantly so that it requires regeneration. Operating conditions in the reactor are maintained so that virtually complete conversion of the $H_2S$ in the sour gas stream is achieved. The allowable sulfur loading on the catalyst will depend on the catalyst itself and the operating parameters employed such as space velocity, residence time, temperature and pressure in the reactor.

BRIEF DESCRIPTION OF THE DRAWINGS

FIG. 6 shows the effects of varying the $O_2/H_2S$ ratio in the feed gas at reaction temperatures of 160 and 175° C. on conversion of hydrogen sulfide to sulfur and to sulfur dioxide. These data published in the Proceedings of the 9th International Congress on Catalysis, Jun. 28, 1988 were obtained under so called "steady state" conditions in which the rate of product sulfur deposition on the catalyst surface was equal to the rate of desorption of sulfur from the catalyst. The conditions chosen were such that the effects of varying the $O_2/H_2S$ ratio and the reaction temperature on the conversion of the $H_2S$ in the feed gas could be observed as shown FIG. 6. It is seen that higher temperature and higher $O_2/H_2S$ ratios increase $H_2S$ conversion but at the expense of increased $SO_2$ production. These findings indicate that, it would be necessary to adjust the temperature and $O_2/H_2S$ stoichiometric ratio within the limits mentioned in clause 1 depending on the concentrations of hydrogen sulfide and the operating pressure in the reactor to achieve virtually complete conversion of the $H_2S$ to sulfur and water and to minimize $SO_2$ production.

Figure 1:
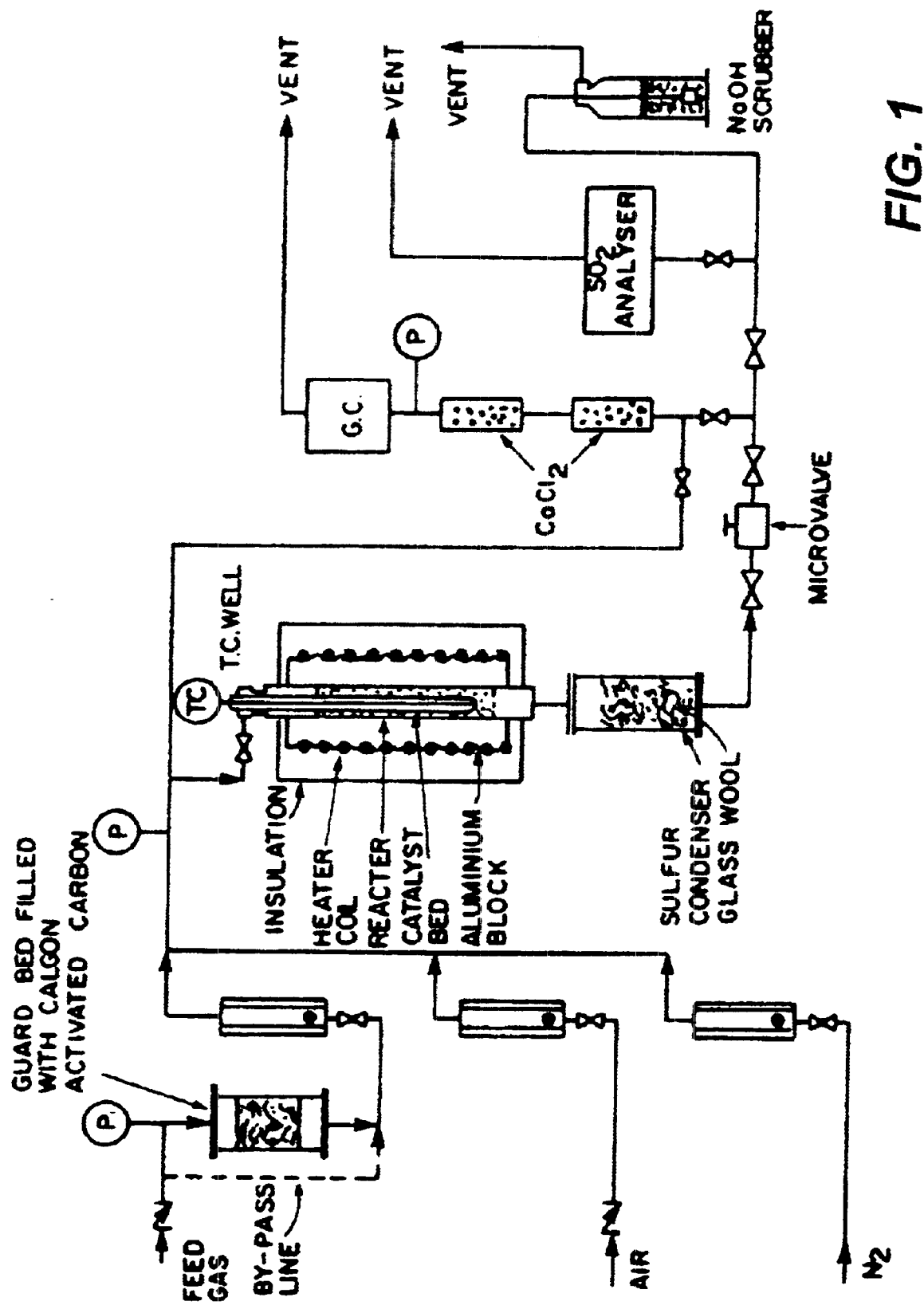
FIG. 1. is a Schematic Diagram of the Apparatus For Runs at Atmospheric Pressure.

It was observed, under certain conditions, that the amount of sulfur depositing on the catalyst from Reaction 3 can be made equal to that vaporizing from the catalyst surface, a condition referred to as the "steady state". From FIG. 2 it is seen that at the "steady state" condition it is possible to oxidize the $H_2S$ to sulfur and water with a comparatively lower level of $H_2S$ conversion on a continuous basis without catalyst regeneration. Under these circumstances the product sulfur may drip out of the catalyst on a continuous basis. Utilizing this steady state conversion of $H_2S$ in the first reactor and using one or more reactors in series after the first one, it is possible to achieve virtually complete conversion of the $H_2S$ for long periods of time.

Because of the exothermic nature of Reactions 3 and 4 producing sulfur and sulfur dioxide, temperature control is of prime importance in maintaining low levels of $SO_2$ production. Calculations have shown that with an initial reaction temperature of 160° C. the reactor can be operated adiabatically with up to approximately 1.0% $H_2S$ in the feed, the final reaction temperature reached being less than 200° C. Under such conditions there is low production of $SO_2$. With greater concentrations of $H_2S$ in the feed gas, it is necessary to provide heat transfer to control the bed temperature below about 200° C. or to do the reaction in stages with heat exchange between stages to cool the reactants and to prevent excessive rise of temperatures.

Where feasible the operating pressure in the reactor should be approximately the same as the pressure at which the gas mixture is to be delivered to a processing plant or to a pipeline at pressures up to approximately 6300 kPa. In this way energy losses due to compression or expansion of the gas are minimized or eliminated and the advantages of operating at higher pressures are gained.

The regeneration of the sulfur-loaded catalyst in the reactor should be conducted at 250–450° C. and at slightly above ambient pressure by passing an inert gas or some of the product gas taken from the system through the catalyst bed. The amount of sulfur allowed to remain in the regenerated catalyst under the conditions chosen may range from 25–50% of the original mass of the catalyst. This sulfur loading of the regenerated catalyst is suggested because of the difficulty encountered in removing the residual sulfur from the micropores of the catalyst due to the "capillary effect".

Experiments show (FIG. 2) that the oxidative activity of the catalyst remains sufficiently high to achieve essentially complete conversion at an intermediate operating pressure such as 640 kPa and even at 130% sulfur loading on the catalyst. Shortly after this point, conversion of the $H_2S$ begins to decrease so it is necessary to regenerate the catalyst or to add a second reactor in series to maintain conversion levels.

When the calorific value required for sale of the gas is not attained due to the amount of nitrogen added with the air required for oxidation of higher concentrations of $H_2S$, oxygen or enriched air may be used to perform the oxidation.

In some cases the feed gas mixtures may contain heavy hydrocarbons which on passage into the reactor may partially reduce the catalyst activity due to fouling. These hydrocarbons may be removed by well-known cryogenic methods or by using in guard bed containing an activated carbon to absorb the heavy hydrocarbons and other sulfur compounds prior to mixing of the sour gas mixture with air/oxygen before the mixture enters the reactor. In the case of natural gas containing heavy hydrocarbons it has been found that the guard bed also absorbs other readily oxidizable components in the condensate fraction which may darken the product sulfur on decomposition. It should be recognized that in purifying gas mixtures which do not contain an appreciable quantity of heavy hydrocarbons, it would not be necessary to include cryogenic equipment or a guard bed.

In practice two guard beds could be used; while one is in operation, the other would be in the regeneration cycle. The proper time for regeneration of the guard bed is indicated when analysis of the gas stream prior to the reactor indicates the presence of traces of heavy hydrocarbons containing six or more carbon atoms.

The regeneration of the activated carbon in the guard beds may be conducted by utilizing a small continuous stream of purified gas, depressurizing it through a pressure-reducing valve, heating the stream to about 350° C. and passing it through the bed to desorb the heavy hydrocarbons and other sorbed components from the activated carbon. The desorbed heavy hydrocarbons along with the regeneration gas may be sent to a high pressure separator via a compressor and a cooler. The desorbed heavy hydrocarbons separated from the regeneration gas may be sent to a liquefied petroleum gas (LPG) recovery unit while the regeneration gas may be sent back to the pipeline or recycled.

It was found that the activated carbon used in the guard bed (CALGON™ SGL of Calgon Corporation or similar material) can absorb heavy hydrocarbons equivalent to 20% of its mass before requiring regeneration. The size of the guard bed and the amount of activated carbon required depends on the amount of heavy hydrocarbons present in the particular sour gas.

The activated carbon used for the guard bed is capable absorbing traces of mercaptans present in the feed gas. It has been discovered however that if the guard beds are not used, these mercaptans are oxidized in the reactor to less odoriferous compounds.

The invention disclosed herein may also be utilized to oxidize the $H_2S$ removed in the acid gases during a conventional sweetening process in the natural gas industry. Such gases are currently incinerated or burned in a flare thereby converting the hydrogen sulfide to sulfur dioxide which is discharged to the atmosphere thereby causing additional atmospheric pollution. Additionally, the process may also be employed as a tail gas clean-up unit after a Claus sulfur plant to oxidize the residual $H_2S$ to elemental sulfur and thereby to increase the overall sulfur recovery efficiency.

DESCRIPTION OF THE PROCESS AND DRAWINGS

Figure 7:
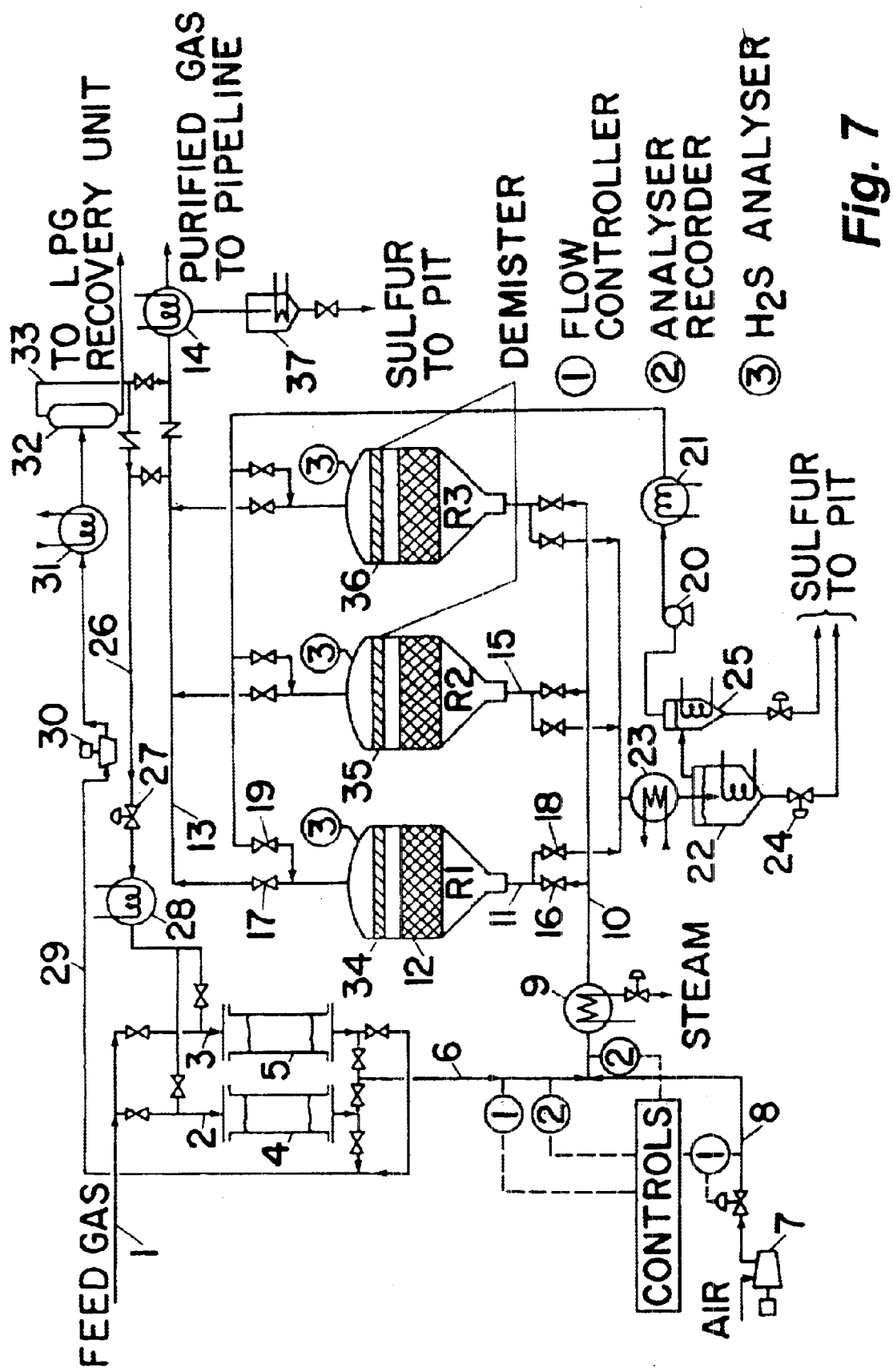
FIG. 7. is a Flow Diagram of a Purification Plant For Natural Gas Containing $H_2S$ and Showing the Use of Three Reactors R1, R2 and R3 and the inlet and outlet streams from the reaction system.

Referring to FIG. 7 describing the process of the invention as applied to sour natural gas, the gas containing hydrogen sulfide is introduced to conduit 1 at pressures available from the well head or at a reduced pressure such that the purified gas can be fed directly to a pipeline without a booster. The gas is directed either through branch 2 or 3 to one of the two guard beds 4 and 5. The heavy hydrocarbons are absorbed by the activated carbon (CALGON™ SGL or the equivalent) in one of the guard beds at ambient temperature and at the supply pressure. The resulting lean gas is then passed through conduit 6 where the total flow is recorded and controlled by a flow controller FRC-1. The concentration of $H_2S$ in the stream is analysed and recorded by analyser recorder AR-1. The required amount of $O_2$ or air is supplied by air compressor 7 at the desired pressure to conduit 8. The amount of air fed is controlled by the $O_2/H_2S$ ratio analyser AR-2 and flow recorder controller FRC-2. The mixed stream is then passed through heater 9 to raise the temperature to between 140–170° C. depending on the other parameters employed. The heated gas mixture is introduced into reactor R1 via conduits 10 and 11. The $H_2S$ is reacted with oxygen in reactor R1 in the presence of the activated carbon catalyst in catalyst bed 12. The sulfur produced during the catalytic oxidation is deposited on the catalyst surface. The purified gas is sent to the pipeline via conduit 13 and cooler 14 at the desired temperature.

When the catalyst has lost some of its activity as indicated by the presence of $H_2S$ in the purified gas stream beyond the allowable limit, the $H_2S$ analyser alarm ARA located at the top of the reactor provides a signal and the flow of the mixture of the gases is then switched to reactor R2 via conduit 10 and 15. Simultaneously, valves 16 and 17 are closed and the pressure in reactor R1 is reduced to about 20 kPa above ambient pressure through a relief mechanism (not shown). The valves 18 and 19 are opened to initiate the catalyst regeneration cycle in reactor R1. The gas remaining in the reactor R1 is then circulated through blower 20 and heater 21. The gas is heated to about 250–450° C. and then continuously circulated from the top of reactor R1 downward. Sulfur is desorbed from the catalyst surface due to reduction of pressure in the reactor as well as due to the increased temperature of the catalyst bed. The sulfur is collected in sulfur collector 22 via valve 18 and cooler 23. The sulfur is kept in the sulfur collector 22 in molten condition and sent to a sulfur pit via a level control valve 24. Trace amounts of sulfur in mist form escaping the sulfur collector along with gas are trapped in the cyclone separator 25. The sulfur-free gas is then sent to reactor R1 via blower 20 and in heater 21 to continue the catalyst regeneration cycle. As soon as catalyst regeneration is complete, reactor R1 is allowed to cool. Similarly when the catalyst in reactor R2 is loaded with sulfur, reactor R3 is put on stream to ensure high levels of conversion of the hydrogen sulfide to sulfur.

A small stream of purified gas is taken through conduit 26 from conduit 13, and pressure reducing valve 27 to reduce the pressure to about 20 kPa above ambient pressure. The gas is then heated in heater 28 to about 350° C. and passed through one of the guard beds requiring regeneration. The desorbed heavy hydrocarbons along with the regenerating gas are passed through the conduit 29, compressor 30, cooler 31 and the high pressure (HP) separator 32. The gas separated from the HP separator 32 is either fed to the purified gas stream via conduit 33 prior to cooler 14 or is used again for guard bed regeneration. The demisters 34, 35, 36 are located above the catalyst bed in each reactor to trap sulfur mist as well as catalyst dust. Any sulfur and water separated during cooling in cooler 14 are collected in the sulfur and water collector 37 for disposal. The condensate recovered in HP separator 32 is sent to the LPG recovery unit.

To demonstrate the invention the following experiments were conducted.

EXAMPLE 1A

Operation of the Process at Pressures up to 640 kPa

A natural gas containing 1.114% hydrogen sulfide was passed through a guard bed containing CALGON™ activated carbon at different pressures up to 640 kPa. The stream was mixed with the required amount of air prior to entering the reactor. The flows of both streams were controlled by means of rotameters as shown in the FIG. 1.

The reactor was constructed from a stainless steel tube, 12.5 mm in diameter, 250 mm long with a screen fitted 2 cm from the bottom end of the tube to support the catalyst. The reactor was snugly fitted into a hole drilled through an aluminum block 55 mm in diameter and having the same length as the reactor. The aluminum block was heated externally by an electrical, beaded, resistance wire, coiled in grooves provided in the outside surface of the block. The aluminum block provided a more uniform temperature throughout the reactor. The temperature was measured by means of a thermocouple, placed in a thermowell immersed in the catalyst bed from the top. The lines to transport the gases consisted of 0.254-inch O.D. stainless steel or high pressure nylon tubing. The sulfur formed was condensed and collected in the sulfur condenser.

The catalyst used in the reactor was 5.00 g dry granular HYDRODARCO™ (lignite based activated carbon—a trademark of NORIT Americas Inc.) manufactured by ICI America Inc. The temperature in the reactor and the $O_2/H_2S$ ratio were 175° C. and 1.2 times stoichiometric, respectively.

Figure 2:
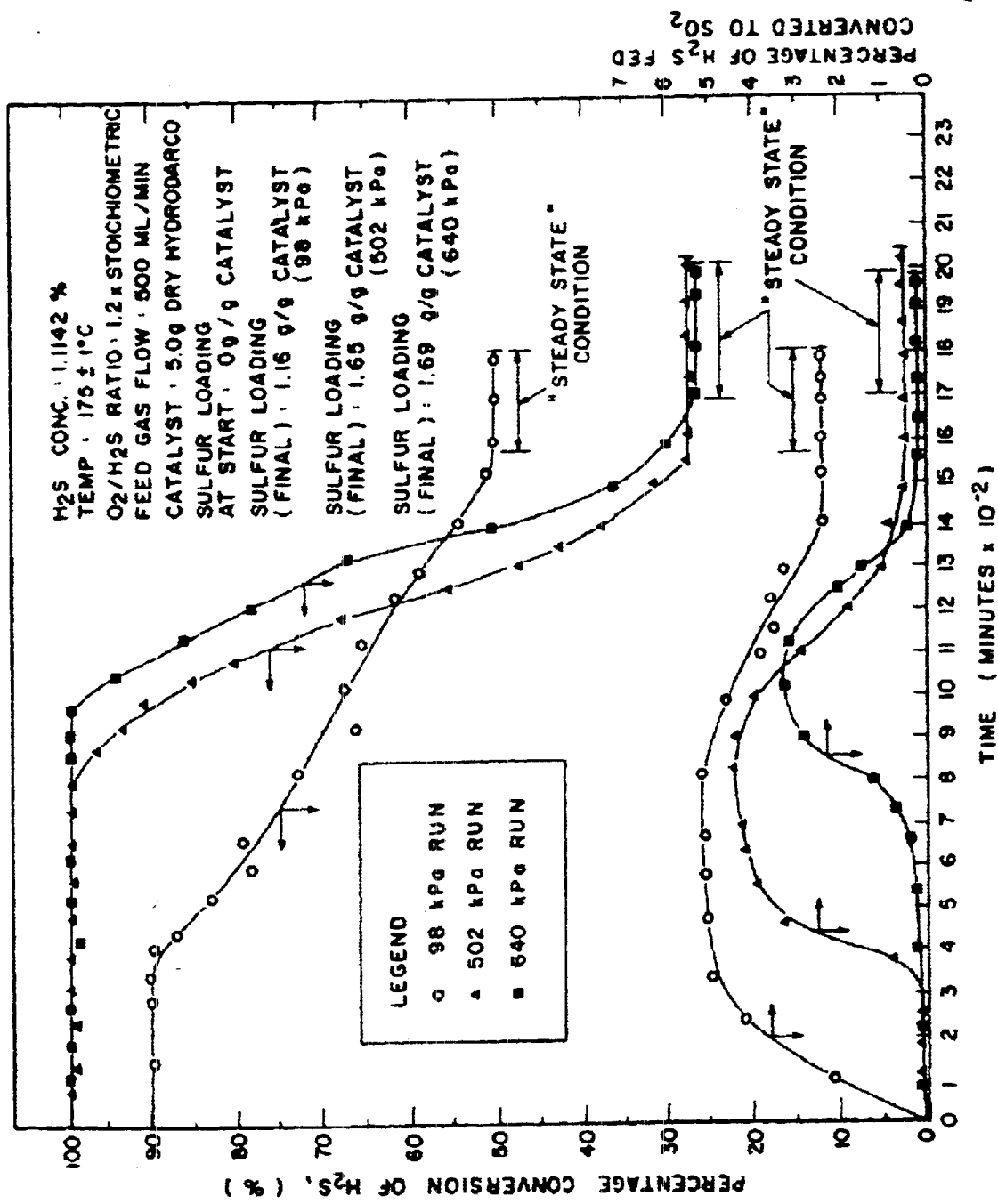
FIG. 2. illustrates the Effects of Pressure on Conversion of Hydrogen Sulfide ($H_2S$) as a Function of Time and Indicates "Steady State" Conditions.

Referring to FIG. 2 it may be seen that when the operation was conducted at 98 kPa, hydrogen sulfide conversion was approximately 90% during the initial 300 minutes of operation and then gradually dropped to approximately 50% at steady state. Conversion to sulfur dioxide also increased rapidly from zero initially and reached 5.5% after 500 minutes. During operation at 502 kPa virtually 100% conversion of the $H_2S$ was achieved for about 800 minutes of operation with less than 0.3% of $H_2S$ feed being converted to $SO_2$ for the initial 300 minutes and then rapidly increased to 4.5%. When the catalytic oxidation was conducted at 640 kPa, virtually 100% conversion of the $H_2S$ was achieved for 1000 minutes of operation with less than 0.3% of $H_2S$ feed being converted to $SO_2$ throughout the initial 700 minutes. Prior to the increase in $SO_2$ production, the sulfur loading on the catalyst was approximately 100% of the mass of the catalyst. Although there was high conversion of the $H_2S$ for another 300 minutes beyond the initial 700 minutes in the case of a full scale plant as described in FIG. 7 the operation would have to be stopped for catalyst regeneration at the point where $SO_2$ production starts to increase.

The concentration of $SO_2$ in product stream was calculated as follows:

Total gas stream=500 mL/min. with 1.114% $H_2S$ $$\text{Total } H_2S = \frac{500 \text{ mL} \times 1.114}{100} = 5.57 \text{ mL/min.}$$

Air added with $O_2/H_2S$ ratio of $1.2 \times$ stoichiometric=

$$\frac{5.57 \times 1.2}{2 \times 0.21} = 15.92 \text{ mL/min.}$$

$$SO_2 \text{ formed} \sim 0.3\% \text{ of } H_2S \text{ feed} = 5.57 \times \frac{0.3}{100} = 0.0167 \text{ mL/min.}$$

Approx. concentration of $SO_2$ in production stream =

$$\frac{0.0167 \times 10^6}{515} = 32.4 \text{ ppm}$$

This concentration is acceptable in the purified natural gas.

EXAMPLE 1B

Advantages of Operating the Process at Pressures at 5600 kPa

Figure 3:
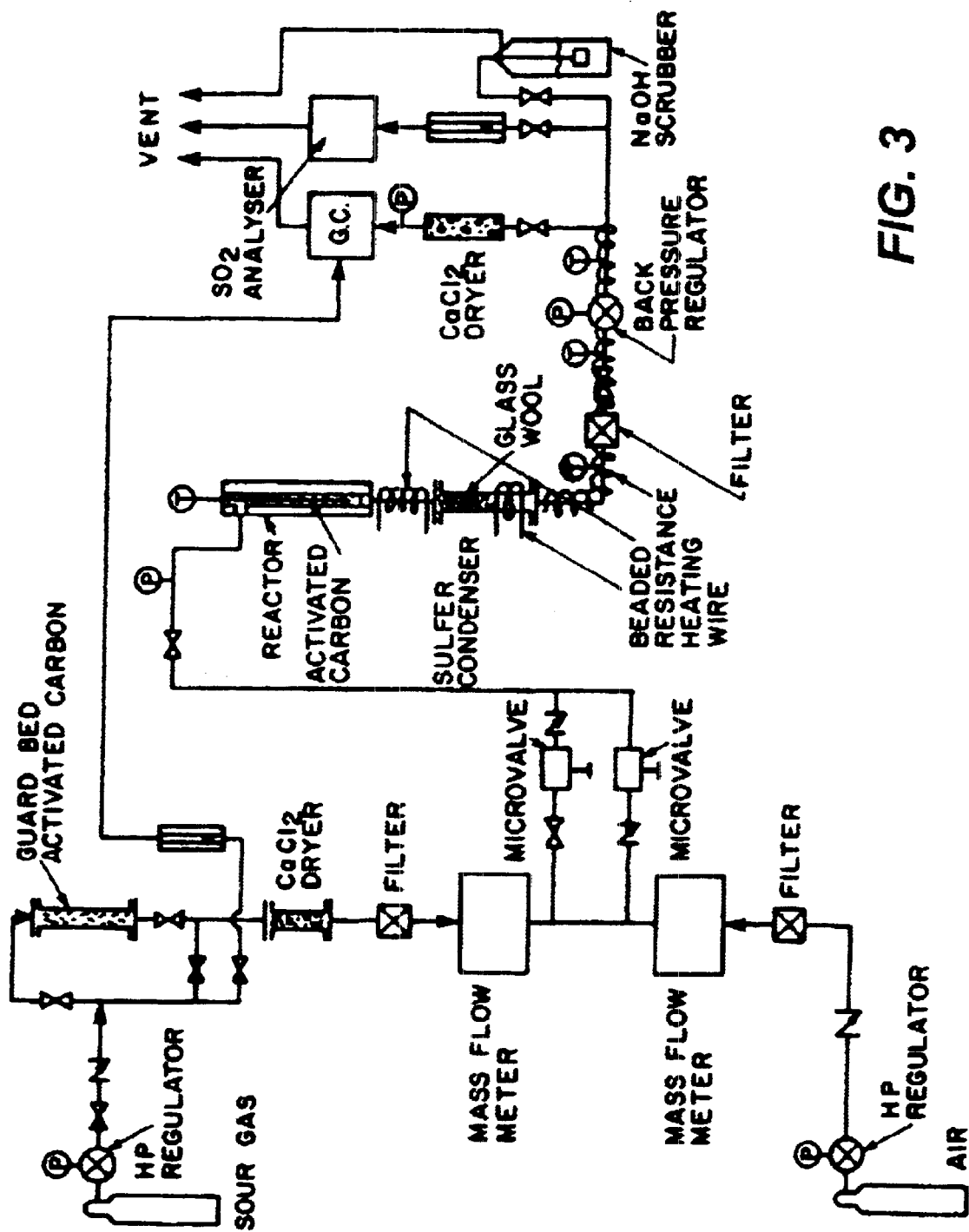
FIG. 3. The Figure is a Schematic Diagram of Apparatus Used for Runs Made at 5600 Ps. P and T stand for pressure and temperature indicating devices.
Figure 4:
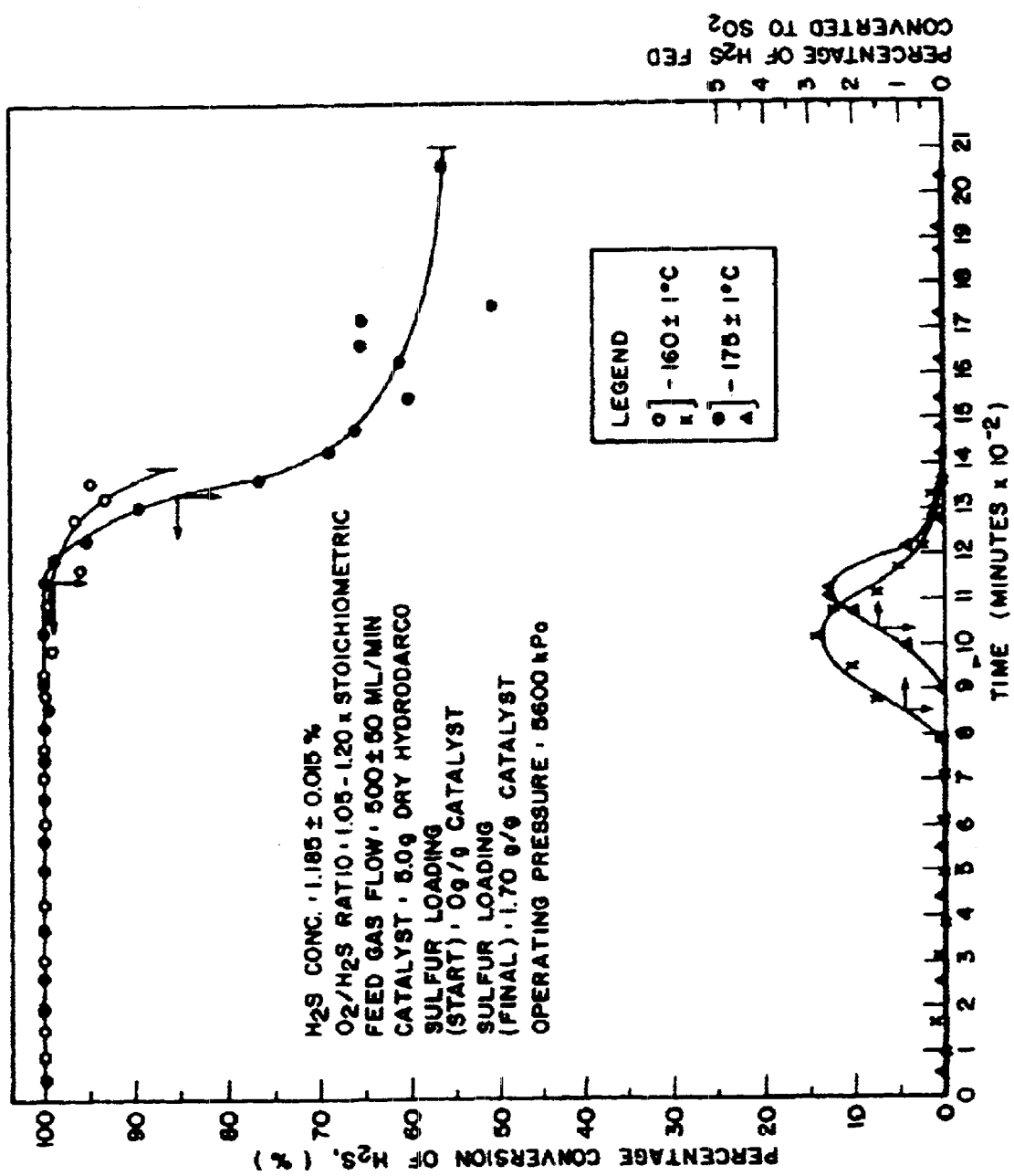
FIG. 4. illustrates the effect of pressure on the conversion of $H_2S$ and $SO_2$ production.

Based on the findings from experiments made at pressures up to 640 kPa, additional runs were conducted at 5600 kPa with the same reactor to further confirm the advantages of elevated pressure operation in terms of higher $H_2S$ conversion and reduced $SO_2$ production. The additional items of equipment used are shown in FIG. 3 and the results of the operation are shown in FIG. 4. Further improvements were observed in terms of high $H_2S$ conversion over a longer period of time and with reduced $SO_2$ production compared with results from runs done at pressures up to 640 kPa

Figure 6:
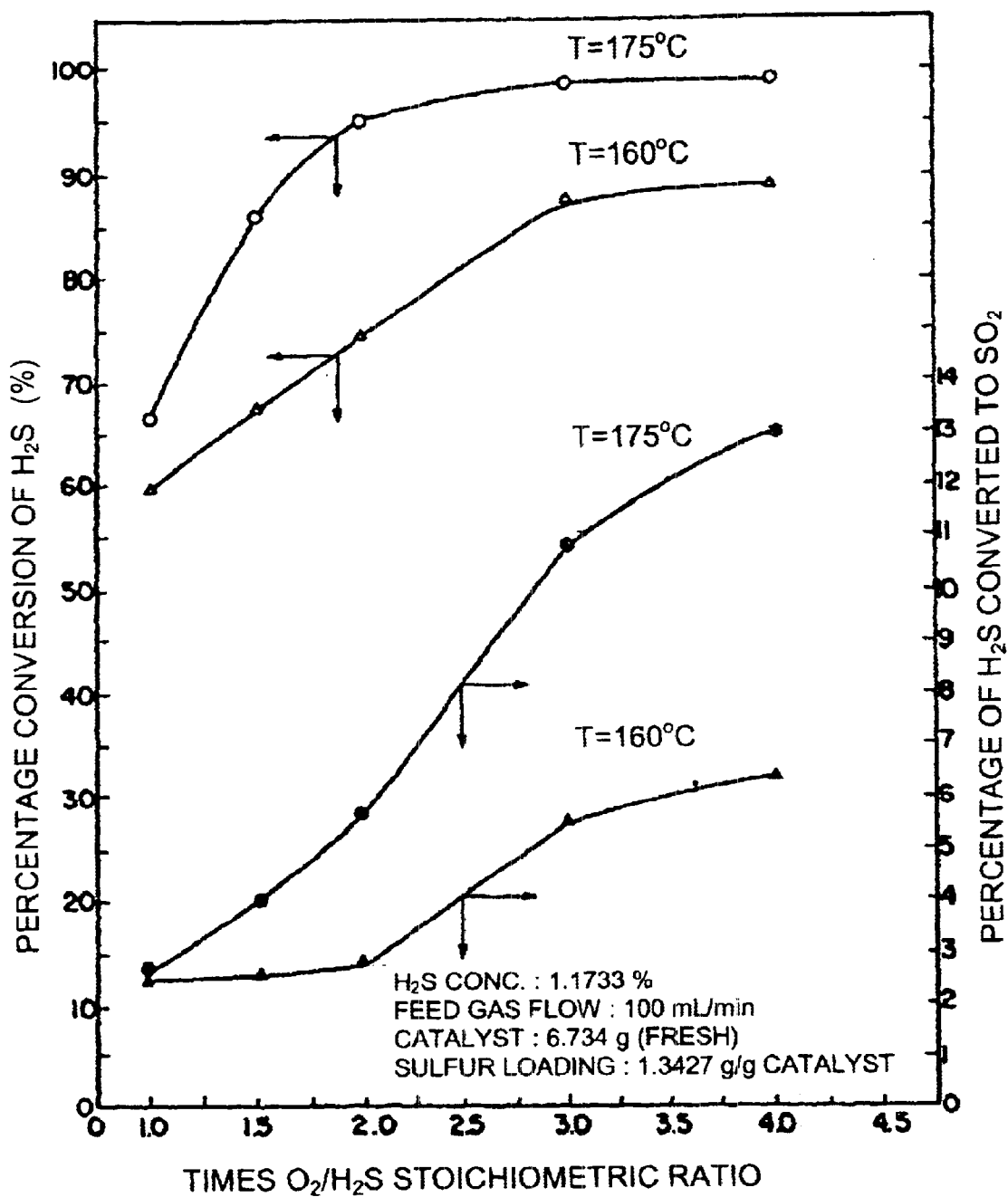
FIG. 6. Illustrates the influence of Oxygen supply on $H_2S$ conversion and $SO_2$ Production at Steady state at different temperatures.

EXAMPLE 2
Influence of $O_2/H_2S$ Ratio on $H_2S$ Conversion and $SO_2$ Production FIG. 6 shows $H_2S$ conversion and $SO_2$ production profiles with increasing $O_2/H_2S$ ratio under "steady state" conditions of operation. The $H_2S$ conversion increases rapidly as the ratio is increased up to 2.0 times the stoichiometric value. The rate of increase then gradually declines as the ratio increases from 2.0 to 3.0 and levels off above 3.0. On the other hand, $SO_2$ production rate increases slowly with $O_2/H_2S$ ratios below 2.0 times stoichiometric but increases more rapidly above this ratio. It is concluded therefore, that to limit $SO_2$ production, it is desirable to keep the $O_2/H_2S$ ratio within the range 1.0 to 2.0 times the stoichiometric ratio, but preferably between 1.1 and 1.5 times the ratio.

EXAMPLE 3
Influence of the Capillary Effect on Vapor Pressure of Sulfur

Figure 5:
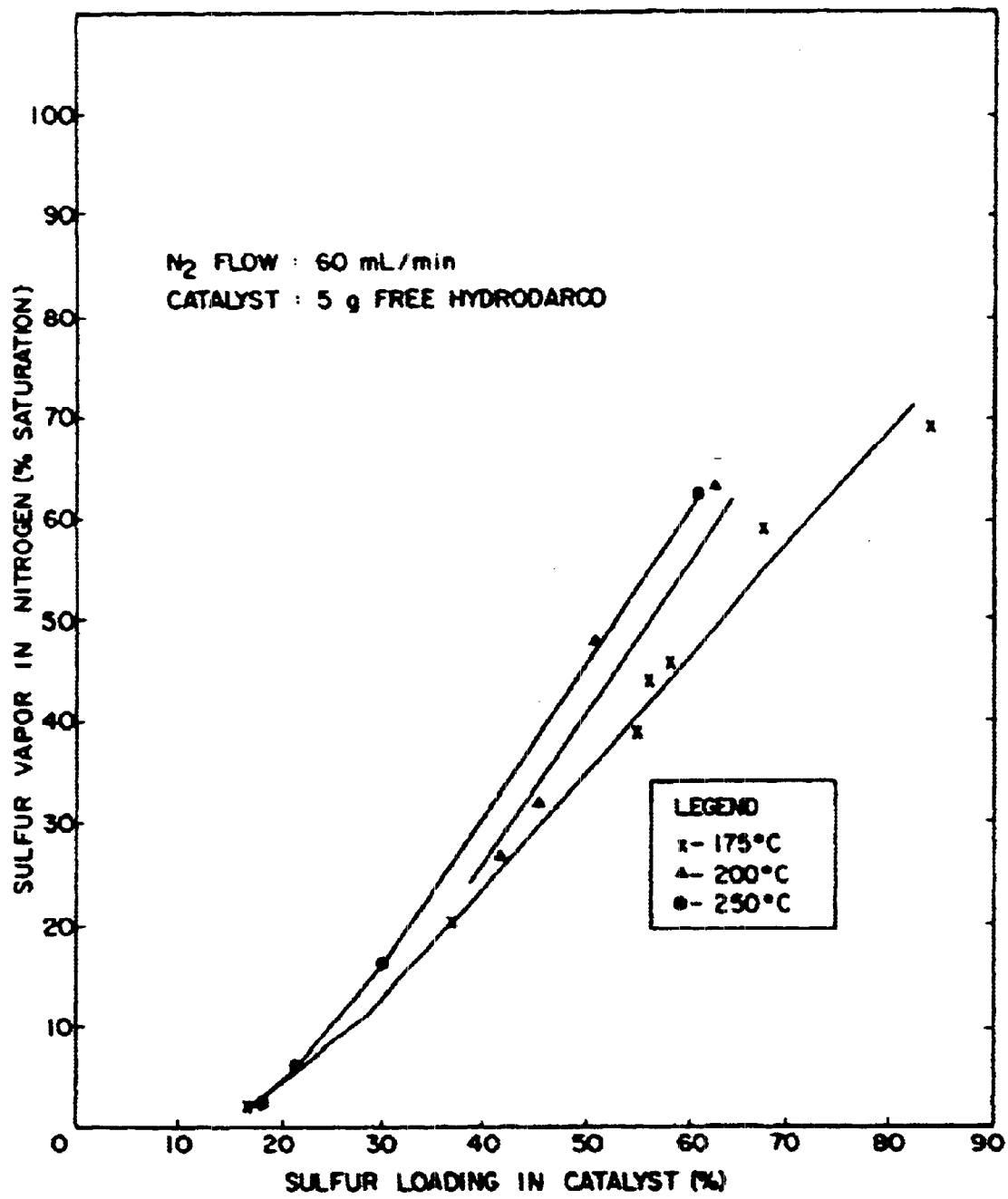
FIG. 5. shows the influence of capillarity on the sulfur vapor pressure over a range of sulfur loadings.

FIG. 5 shows the influence of the capillary effect in reducing the sulfur vapor pressure in a nitrogen atmosphere with decreasing sulfur loading. The experiment was conducted with a catalyst which was loaded with sulfur equal to 85.8% of its mass and placed in the reactor. The removal of sulfur from the catalyst with a low flow of nitrogen at various temperatures was measured from time to time to calculate the percentage saturation of sulfur vapor in the nitrogen. It was found that as the sulfur loading in the catalyst is reduced the vapor pressure of sulfur in the gas flowing over the catalyst is reduced appreciably due to the influence of capillary effects on the sulfur in the micropores. This phenomenon explains the low $SO_2$ production when the sulfur loading on the catalyst is low. As shown in the figure the percentage saturation of sulfur in the nitrogen carrier gas at a given sulfur loading is higher at higher temperatures but the difference tends to diminish with lower sulfur loading. This plot indicates the difficulty which is encountered in regeneration of the catalyst if attempts are made to remove all of the sulfur from the catalyst. For practical reasons leaving 20 to 30% of the sulfur on the catalyst after regeneration circumvents this problem.

The embodiments of the invention in which an exclusive property or privilege is claimed are defined as follows:

1. A process for the oxidation and elimination of $H_2S$ from gas mixtures comprising adding oxygen to the said mixture to obtain an $O_2/H_2S$ molar ratio in the mixture of between 0.5:1.0 and 1.5:1.0, passing the said gas mixture into at least one activated carbon bed contained in a reaction vessel and subjecting the said $H_2S$ to the catalytic action of the activated carbon under reaction conditions which produce elemental sulfur with minimal production of $SO_2$ so that the elemental sulfur produced by the reaction is sorbed by the catalyst while the purified gas is recovered as product, the activated carbon having a mean pore radius of about 2.9 nm, and a pore volume of about 1.0 $cm^3/g$, the activated carbon being subjected to periodic regenerations so that the sorbed sulfur is removed therefrom as another product.

2. A process according to claim 1, said reaction conditions being selected from a temperature range of between about 130° C. to about 220° C. and a gas pressure range of between about 100 kPa to 7000 kPa.

3. A process according to claim 1 wherein the $O_2/H_2S$ molar ratio in the mixture is between 1.1 and 1.5 times the stoichiometric ratio.

4. A process according to claim 1 wherein the gas mixture is natural gas.

5. A Process according to claim 1 wherein a concentration of $H_2S$ is above 1.0% further comprising providing heat exchange to control the temperature of the reaction.

6. A process according to claim 1 wherein a concentration of $H_2S$ is above 1.0% further comprising providing two or more reactors in series for complete conversion of the $H_2S$ with heat exchange between said reactors to control the reaction temperature.

7. A process according to claim 1 wherein the activated carbon catalyst is loaded with produced sulfur from $H_2S$ oxidation up to 80 to 150% of the mass of the catalyst before regeneration.

8. A process according to claim 1 wherein the activated carbon catalyst in the reactor becomes loaded with produced sulfur from $H_2S$ oxidation to about 150% of the mass of the catalyst under which conditions sulfur will flow from said reactor when operated at elevated pressure of between about 100 kPa to 7000 kPa and the product gas stream being passed into a second reactor in series to provide virtually complete conversion of the $H_2S$.

9. A process according to claim 8 in which the catalyst is regenerated with gas selected from the group consisting of inert gas and the purified gas that remains in the system after heating to 250 to 450° C. and at pressures above atmospheric pressure, the regeneration time being sufficient so that sulfur remaining absorbed on the catalyst is no more than 50% of the mass of the catalyst.

10. A process according to claim 1 which utilizes three reactors and in which at any time one reactor is in the operation mode oxidizing $H_2S$ in the feed gas, while a second is in the regeneration mode and the third is in the cooling.

11. A process according to claim 1 which employs two alternatively-used guard beds filled with an activated carbon to absorb heavy hydrocarbons of carbon number equal to or greater than six and to protect the catalyst in the reactors from being fouled so that the product sulfur is not darkened.

12. A process according to claim 11 in which activated carbon in the two guard beds is regenerated using a continuous stream of purified gas which was depressurized through a pressure reducing valve, said gas being heated to between 300 and 400° C. and then passed through the bed to desorb the heavy hydrocarbons from the activated carbon, the desorbed heavy hydrocarbons being separated from purified gas in a pressure separator following recompression of said purified stream containing the desorbed heavy hydrocarbons.

13. A process according to claim 11 in which the guard bed carbon is capable of absorbing mercaptans present in the feed gas.

14. A process according to claim 1 utilized to oxidize $H_2S$ removed from acid gases after a conventional sweetening process.

15. A process according to claim 1 utilized as a tail gas clean-up unit for removal of residual $H_2S$.

* * * * *